United States Patent [19]
Wagensonner et al.

[11] 3,798,663
[45] Mar. 19, 1974

[54] PHOTOGRAPHIC CAMERA WITH ARRANGEMENT FOR DETERMINING SCENE LIGHT SUFFICIENCY AND FOR CONTROLLING EXPOSURE TIMING

[75] Inventors: Eduard Wagensonner, Aschheim; Kurt Borowski, Munich; Walter Fürst, Deisenhofen, all of Germany

[73] Assignee: Agfa-Gevaert Aktiengesellschaft, Leverkusen, Germany

[22] Filed: June 19, 1973

[21] Appl. No.: 371,568

[30] Foreign Application Priority Data
June 23, 1972 Germany............................ 2230865

[52] U.S. Cl. .............................................. 95/10 CE
[51] Int. Cl. .............................................. G03b 7/08
[58] Field of Search ...................... 95/10 CE, 10 CT

[56] References Cited
UNITED STATES PATENTS
3,593,629   7/1971   Rentschler .............................. 95/10
3,742,827   7/1973   Wisst et al. .............................. 95/10

Primary Examiner—Fred L. Braun
Assistant Examiner—Michael L. Gellner
Attorney, Agent, or Firm—Michael S. Striker

[57] ABSTRACT

The camera is provided with a first circuit for determining scene light sufficiency, and with a second circuit for controlling exposure timing. Both circuits share and make use of the same photoelectric component. Electronic switches are provided for alternatively connecting the photoelectric component to the first circuit, to determine the sufficiency of scene light, or else for connecting the photoelectric component to the second circuit, to perform an exposure timing operation. A mechanical switch is connected to the electronic switches and is operative for causing the electronic switches to connecting the photoelectric component into one or the other of the two circuits. The photoelectric componet may consist of one or more photoelectric elements.

10 Claims, 2 Drawing Figures

3,798,663

PHOTOGRAPHIC CAMERA WITH ARRANGEMENT FOR DETERMINING SCENE LIGHT SUFFICIENCY AND FOR CONTROLLING EXPOSURE TIMING

BACKGROUND OF THE INVENTION

The present invention relates to a photographic camera provided with an arrangement for detecting scene light sufficiency and also provided with an arrangement for controlling exposure timing automatically in dependence upon scene light.

Inasmuch as both these arrangements require the use of a photoelectric component, such as a photoelement or an array of photoelements, it has already been attempted to utilize the same photoelectric component in both arrangements. A camera is known in the prior art in which the photographer, prior to making an exposure, manually activates a plurality of mechanical switches in such a manner as to disconnect the photoresistor from the exposure timing circuitry and connect it into the circuitry which determines light sufficiency. After the sufficiency of scene light has been determined, the reverse operation takes place. The photoresistor is disconnected from the circuitry which determines light sufficiency and is reconnected to the exposure timing circuitry, this latter circuitry being of the type employing a timing capacitor. The mechanical switches necessary to effect these connections and disconnections are disadvantageous. Mechanical switches have the disadvantage that they tend to chatter and that after extended use their contacts become fouled. Fouled contacts create the problem of contact resistance.

In another camera known in the prior art, in order to avoid the disadvantages brought about with the use of mechanical switches, two discrete photoelectric components are provided one permanently connected to the exposure-timing circuitry and the other permanently connected to the circuitry for determining light sufficiency.

SUMMARY OF THE INVENTION

It is the general object of the present invention to provide in a photographic camera an arrangement for determining scene light sufficiency and for automatically controlling the exposure timing.

It is a more particular object of the present invention to provide a camera with such an arrangement without incurring the disadvantages of prior-art expedients.

It is a still more specific object of the present invention to provide a camera with the two arrangements in question, sharing a common photoelectric component.

These objects, and others which will become more understandable from the following description, can be met, according to the invention, by providing in a photographic camera an arrangement comprising first circuit means for determining scene light sufficiency, second circuit means for controlling exposure timing, a photoelectric component, and electronic switch means operative in a first state for operatively connecting the photoelectric component to the first circuit means to determine scene light sufficiency, and operative in a second state thereof for operatively connecting said photoelectric component to the second circuit means for performing an exposure timing operation. Mechanical switch means connected to the electronic switch means is operable for causing the latter to assume either said first or said second state thereof.

It is contemplated, as one possibility according to the invention, to provide an exposure timing arrangement of the type using a timing capacitor which is charged up to a predetermined voltage, which when reached causes the shutter to fall closed. When this kind of timing arrangement is employed, it is considered advantageous to connect an electronic switch in parallel with the timing capacitor, to short-circuit the capacitor when an exposure is not being made. This is a marked improvement over the practice of short-circuiting the timing capacitor by means of a mechanical switch connected thereacross.

According to the invention, it is contemplated to make and break the connections necessary for the two operating modes through the use of electronic switches, to the extent possible, with the electronic switches being so interconnected with each other that they can be controlled to effect change-overs between the two operating modes using only a single mechanical switch. Such an approach is advantageous not only because it minimizes the disadvantages explained above, but also because it makes possible the manufacture of the entire circuitry for determining light sufficiency together with the entire circuitry for exposure timing as a single unit, for example by integrated-circuit techniques on a single semiconductor chip. This makes possible significant reductions in the size of the cameras made according to the invention.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
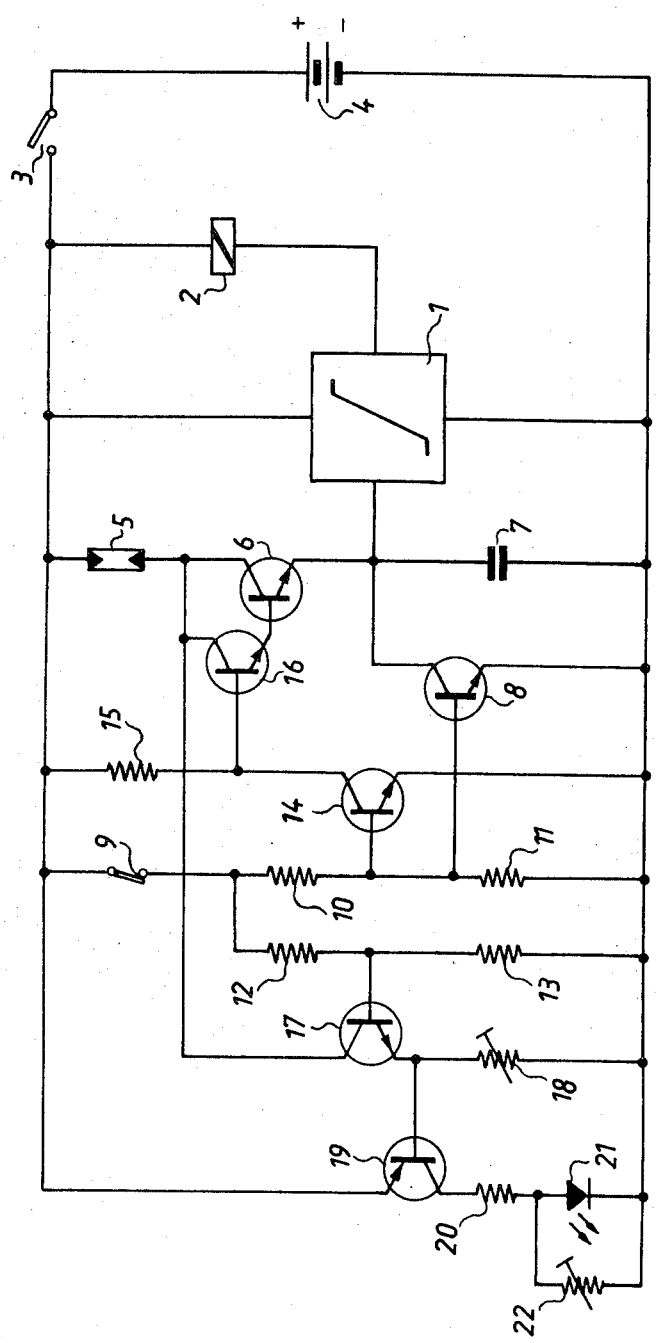
FIG. 1 depicts a first embodiment according to the invention.

Discussing firstly the embodiment of FIG. 1 it is noted that reference numeral 1 designates a first threshold-detecting means having an output connected to a shutter-control electromagnet 2 and having an input connected across timing capacitor 7. The threshold-detecting means 1 may for example be in the form of a Schmitt trigger. Alternatively, it could have the form of a difference amplifier, one of whose inputs is connected to a fixed threshold-determining voltage and the other of whose inputs is connected to the capacitor 7. Other possible circuits for the threshold-detecting means 1, as well as for the other threshold-detecting means employed, will be evident to those skilled in the art.

A switch 3, activated by the non-illustrated shutter-release button, connects voltage source 4 to threshold-detecting means 1. The input of unit 1 is connected with a series circuit consisting of a photoresistor 5, the collector-emitter path of a transistor 6 and the timing capacitor 7 mentioned before. A transistor 8 is connected parallel to the timing capacitor 7.

A switch 9 is provided for effecting changeovers from the first mode of operation, in which the sufficiency of scene light is determined, to the second mode of operation, in which an exposure-timing operation is performed. Switch 9 is normally closed, as shown in the drawing. When closed it connects a first voltage divider 10, 11 and also a second voltage divider 12, 13 across the voltage source 4. The tap of voltage divider 10, 11, being the junction between resistors 10 and 11, is connected to the base of transistor 8. This same voltage-divider tap is connected to the base of an inverting transistor, whose purpose is to maintain transistor 6 non-conductive when transistor 8 is conductive. The inverting transistor 14 includes in its collector circuit a collector resistor 15. The collector of transistor 14 is furthermore connected to the base of a transistor 16, whose emitter is connected with the base of transistor 6 and whose collector is connected with the collector of transistor 6, in Darlington configuration.

The voltage-divider tap between resistors 12 and 13 is connected to the base of a transistor 17. The collector of transistor 17 is connected with that terminal of photoresistor 5 which is connected to the collector of transistor 6. The emitter of transistor 17 is connected to a resistor 18. The emitter of transistor 17 is connected to the base of transistor 19. In the collector circuit of transistor 19 there are connected a resistor 20, a light-emitting diode 21 and a further resistor 22.

The arrangement of FIG. 1 operates in the following manner.

When the user of the camera depresses the shutter-release button a small distance, switch 3 closes, connecting voltage source 4 to the illustrated circuitry. Switch 9 is normally closed, and if the shutter button is depressed only a small distance, it will remain closed.

The resistance values of resistors 10, 11 and 12, 13 are so chosen that when switches 9 and 3 are closed, transistors 8, 14 and 17 become conductive. Accordingly, timing capacitor 7 is short-circuited the collector-emitter path of transistor 8, and cannot charge up. Furthermore, because the potential at the collector of transistor 14 will be low, transistors 16 and 6 will both be non-conductive.

Because transistor 17 is fully conductive, the photoresistor 5 is in effect connected in series with the resistor 18. The collector-emitter voltage of transistor 17 is negligibly small, and the resistors 5, 18 accordingly form in effect a voltage divider having a tap connected to the base of transistor 19. The voltage at the base of transistor 19 will vary in dependence upon the brightness of light incident upon photoresistor 5. Transistor 19 will become conductive, and light-emitting diode 21 will light up, if the scene light incident upon photoresistor 5 is of insufficient brightness for the making of an exposure. The user of the camera will accordingly know whether or not he should proceed to take a picture.

If the shutter-release button is pressed further down, to mechanically effect shutter opening, switch 9 opens, and the voltages at the bases of transistors 8, 14 and 17 fall below the values necessary for conduction, and transistors 8, 14 and 17 accordingly become non-conductive. The turning-off of transistor 8 in effect removes the short-circuit from across timing capacitor 7.

Moreover, the rise in the collector voltage of transistor 14 turns transistors 16 and 6 on, so that timing capacitor 7 can charge up through photoresistor 5 and the collector-emitter path of transistor 6. Moreover, because transistor 17 has become non-conductive, photoresistor 5 is in effect disconnected from the input of the threshold-detecting transistor 19, i.e., disconnected from the base thereof. The functional separation of the exposure-timing circuit from the light-metering circuit is accordingly complete.

Since transistor 19 is a pnp-transistor, and because its base voltage falls to the negative battery voltage when switch 9 is opened, transistor 19 will become conductive. Accordingly, light-emitting diode 21 will be lit up during the taking of an exposure, and will indicate to the user of the camera the fact that the shutter is open.

The shutter, which is initially opened by mechanical means upon complete depression of the non-illustrated shutter-release button, is thereafter maintained open by the force of electromagnet 2, which is maintained energized during the taking of an exposure. Timing capacitor 7 charges up from zero voltage at a rate dependent upon the brightness of light incident upon photoresistor 5. When the voltage across capacitor 7 reaches the threshold value to which threshold-detecting means 1 is preset, electromagnet 2 will become de-energized, and the shutter will close.

Figure 2:
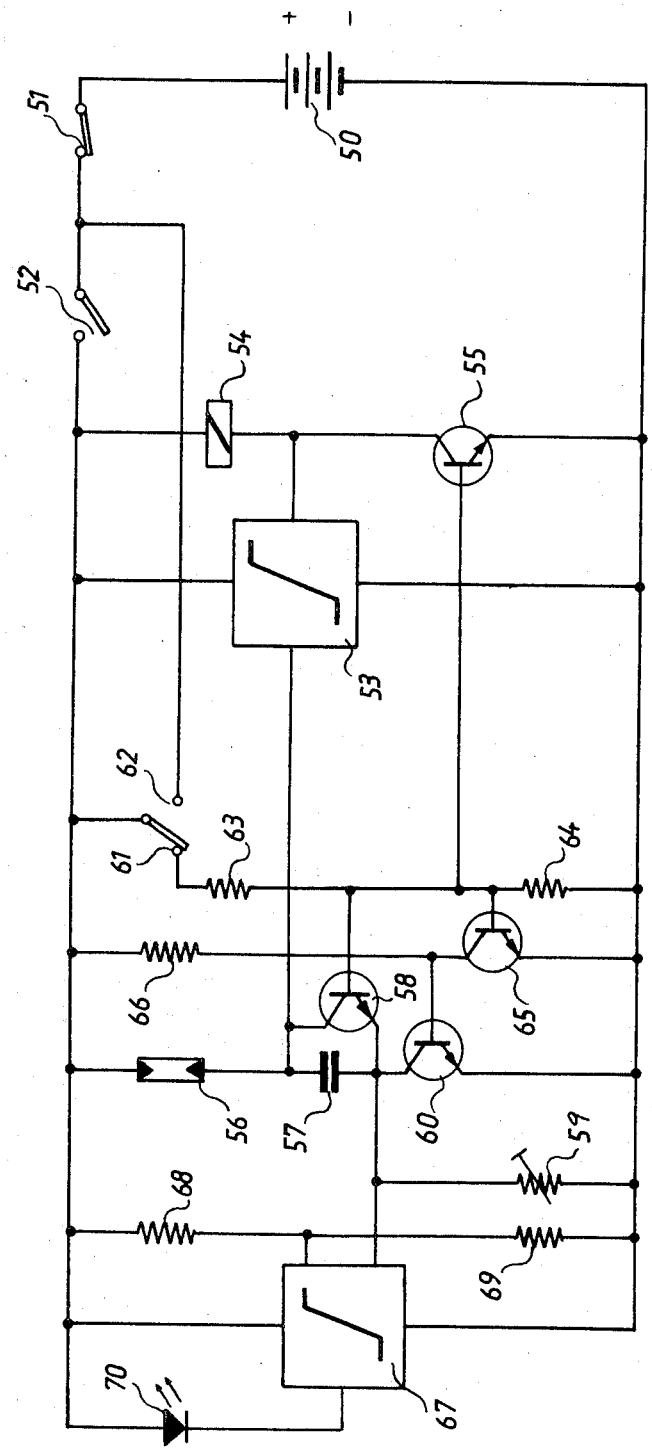
FIG. 2 depicts a second embodiment according to the invention.

The embodiment depicted in FIG. 2 is similar to that shown in FIG. 1. Reference numeral 50 designates a voltage source. Reference numeral 51 designates a switch maintained closed until the exposure operation is terminated, and reference numeral 52 designates a switch connects the voltage source 50, by means of the switch 51 to the remainder of the illustrated circuitry.

A first threshold detector 53 has an output connected to a shutter-control electromagnet 54. Electromagnet 54 is furthermore connected in the collector circuit of transistor 55, and can be energized either by current flowing through transistor 55 or by current flowing through the internal circuitry of the threshold-detecting stage 53. The input of threshold-detector 53 is connected to a voltage divider comprised of a photoresistor 56, a timing capacitor 57 and the collector-emitter path of a transistor 60. The collector-emitter path of a transistor 58 is connected across timing capacitor 57. A resistor 59 is connected in parallel with the base-emitter path of transistor 60. Although the collector-emitter paths of transistors 58 and 60 are connected in series, it is not intended that current should flow through both current paths simultaneously. To this end, an inverter transistor 65 is provided. The provision of transistor 65 assures that when transistor 58 is conductive, transistor 60 will be non-conductive.

A two-position switch 61, 62, when in its illustrated position, connects a voltage divider 63, 64 across the voltage source 50. The voltage-divider tap intermediate resistors 63, 64 is connected to the base of transistor 58, and transistor 58 will be conductive when voltage divider 63, 64 is connected across source 50. The tap of voltage divider 63, 64 is furthermore connected to the base of inverter transistor 65 referred to above. The collector of transistor 65 is connected to the base of transistor 60. When voltage divider 63, 64 is connected across source 50, transistor 65 becomes conductive, and accordingly transistor 60 becomes non-conductive. Transistor 65 is provided with a collector resistor 66.

The tap of voltage-divider 63, 64 is furthermore connected to the base of transistor 55. The collector of transistor 60 is connected to one input of a second threshold-detector 67. The threshold voltage to which detector 67 is determined by the voltage applied to its other input from the tap of voltage divider 68, 69. A light-emitting diode is connected in the output circuit of the threshold detector 67.

The operation of the embodiment shown in FIG. 2 is as follows.

The user of the camera depresses the non-illustrated shutter-release button a small distance, causing switches 51 and 52 to close, so that the circuit becomes connected to the camera battery. The resistance values of the resistors 63 and 64 are so chosen or adjusted that when the switch 61, 62 engages contact 61, as shown in FIG. 2, transistors 58, 65 and 55 are rendered conductive. The establishment of a current path through the collector-emitter path of transistor 55 makes for immediate energization of the electromagnet 54, in advance of actual opening of the shutter. It should be noted that the exemplary camera illustrated here is of the type wherein the shutter is opened principally by mechanical force, maintained opened by electromagnetic force, and then closed when the electromagnetic force is removed. The invention is of course applicable to other types of cameras.

Accordingly, in the embodiment of FIG. 2, the electromagnet 54 is energized in advance of shutter opening, via transistor 55, to ensure that it will be fully energized at the time the shutter is opened.

Transistor 58, now conductive, short-circuits timing capacitor 57, which accordingly cannot charge up. Furthermore, because transistor 65 is fully conductive, transistor 60 is kept non-conductive, so that the resistor 59 is in effect connected in series with the photoresistor 56 to form a voltage divider having a voltage-divider tap connected to the lower input of the second threshold-detecting means 67. The voltage at the tap of the voltage divider formed from components 56, 59 will vary in accordance with scene brightness, and will reach values causing light-emitting diode 70 to light up, or not, depending upon whether the scene light is sufficient for the taking of an exposure. In the embodiment of FIG. 2, the light-emitting diode 70 lights up when the scene brightness is not sufficient for the taking of an exposure. It will be apparent that the threshold voltage of threshold detecting means 67 is established by the voltage applied to its upper input, which is the voltage at the junction between voltage-divider resistors 68 and 69. The resistance values of resistors 68 and 69 are so selected that, if the battery voltage falls below a predetermined value, the diode 70 will not light up when the photoresistor 56 is blocked from scene light, for instance by being covered by the user's hand. This arrangement accordingly provides, inherently, means for determining when the battery voltage is too low for satisfactory operation, without the need for any additional circuit components such as adjusting resistors connected in series and in parallel with the light-emitting diode 70.

From the foregoing it will be clear that to determine light sufficiency the camera user depresses the non-illustrated shutter-release button a small distance, which will effect the aforedescribed operations but will not actually effect shutter opening.

To effect shutter opening, the camera user depresses the shutter release button a further distance. Such further depression of the shutter-release button causes switch 61, 62 to move to its non-illustrated position, in which it engages contact 62 and short-circuits switch 52. As a result, biasing voltage is no longer applied to the bases of transistors 58, 55 and 65, and these transistors become immediately non-conductive. From this point on, the electromagnet 54 is maintained energized only by virtue of a current path passing through the threshold-detecting means 53. Also, turning off of transistor 58 terminates the short-circuiting of timing capacitor 57. Furthermore, the turn-off of transistor 65 results in a turn-on of transistor 60, which on the one hand short-circuits resistor 59, and on the other hand establishes a charging path for capacitor 57 through photoresistor 56 and through the collector-emitter path of transistor 60. The voltage across the timing capacitor 57 accordingly charges up from zero, until it eventually reaches the threshold voltage of threshold detector 53. At this moment, the current path for electromagnet 54 is interrupted, and the electromagnet 54 becomes de-energized, causing the shutter to close. In this way the exposure-timing operation is completed. The power switch 51 is opened at the end of the exposure-timing operation by suitable non-illustrated means, for instance upon upward movement of the shutter-release button.

It will be understood that each of the elements described above, or two or more together, may also find a useful application in other types of circuits and constructions differing from the types described above.

While the invention has been illustrated and described as embodied in a photographic camera, it is not intended to be limited to the details shown, since various modifications and structural changes may be made without departing in any way from the spirit of the present invention.

In particular, it is noted that in the illustrated embodiments a single photoresistor is switched either into a circuit for determining scene light sufficiency, or else into a circuit for controlling the exposure time. Under certain circumstances, it may be desirable to provide more than a single photoelectric element. The invention is still applicable however, when a plurality of such elements are used for both the aforedescribed purposes in the manner described above.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalents of the following claims.

What is claimed as new and desired to be protected by Letters Patent is set forth in the appended claims:

1. In a photographic camera, an arrangement comprising, in combination, first circuit means for determining scene light sufficiency; second circuit means for controlling exposure timing; a photoelectric component; electronic switch means operative in a first state thereof for operatively connecting said photoelectric component to said first circuit means for determining scene light sufficiency, and operative in a second state thereof for operatively connecting said photoelectric component to said second circuit means for performing an exposure timing operation; and mechanical switch means connected to said electronic switch means and operative for causing the latter to assume either said first or said second state thereof.

2. An arrangement as defined in claim 1, wherein said first circuit means comprises signalling means, first threshold-detecting means having an output connected to said signalling means and having a respective first input, a voltage source, a resistor having one terminal connected to one terminal of said source and having its other terminal connected to said first input, and wherein said second circuit means comprises a shutter-control electromagnet, second threshold-detecting means having an output connected to said electromagnet and having a respective second input, and a timing capacitor connected to said second input for applying thereto a voltage varying in dependence upon the voltage across said timing capacitor, and wherein said photoelectric component has one terminal connected to the other terminal of said voltage source, and wherein said electronic switch means is operative in said first state for operatively connecting the other terminal of said component to said first input to form a voltage divider comprised of said resistor and said photoelectric component and having a tap connected to said first input, and wherein said electronic switch means comprises a first electronic switch connected in parallel with said timing capacitor to become conductive when said electronic switch means is in said first state for short-circuiting said timing capacitor, and a second electronic switch conductive when said electronic switch means is in said second state and operative for establishing a flow of common current through said timing capacitor and said photoelectric component to effect a change of the voltage across said capacitor at a rate dependent upon scene light, and wherein said mechanical switch means comprises a single mechanical switch operable for causing said electronic switch means to assume either said first or said second state thereof.

3. An arrangement as defined in claim 2, wherein said first and second electronic switches are connected in series, and wherein said second electronic switch is connected in parallel with said resistor, and wherein said electronic switch means further includes inverter means connected to one of said electronic switches and operative for causing one of said electronic switches to be non-conductive when the other of said electronic switches is conductive.

4. An arrangement as defined in claim 2, wherein said first and second electronic switches are connected in series, and wherein said second electronic switch is connected between said photoelectric component and said timing capacitor in series therewith, and wherein said electronic switch means further includes inverter means connected to one of said electronic switches and operative for causing one of said electronic switches to be non-conductive when the other of said electronic switches is conductive, and a third electronic switch connected between said first input and said other terminal of said photoelectric component and so connected as to be conductive when said electronic switch means is in said first state.

5. An arrangement as defined in claim 4, wherein said second electronic switch comprises two transistors connected to each other in Darlington configuration.

6. An arrangement as defined in claim 2, wherein said first and second electronic switches have control electrodes for controlling the conductivity of the respective switches, and wherein said electronic switch means comprises a voltage divider having a tap connected to the control electrode of at least one of said switches, and wherein said single mechanical switch is operative for connecting said voltage divider of said electronic switch means across said voltage source to render said one of said switches conductive.

7. An arrangement as defined in claim 2, the camera including a movable shutter-release member activatable by the camera user, said shutter-release member being arranged to contact and activate said single mechanical switch.

8. An arrangement as defined in claim 2, the camera including a movable shutter-release member and a further member coupled to said shutter-release member and movable in response to movement of the latter, said further member being arranged to contact and activate said single mechanical switch.

9. An arrangement as defined in claim 2, and further including a release switch for connecting said voltage source to said first and second circuit means, and wherein said single mechanical switch is a two-position switch operative in one of its positions for connecting said voltage source to said electronic switch means via said release switch and operative in the other of its positions for short-circuiting said release switch.

10. An arrangement as defined in claim 2, wherein said electronic switch means further comprises means operative when said electronic switch means is in said first state thereof for energizing said electromagnet by connecting said electromagnet directly across said voltage source.

* * * * *